UNITED STATES PATENT OFFICE.

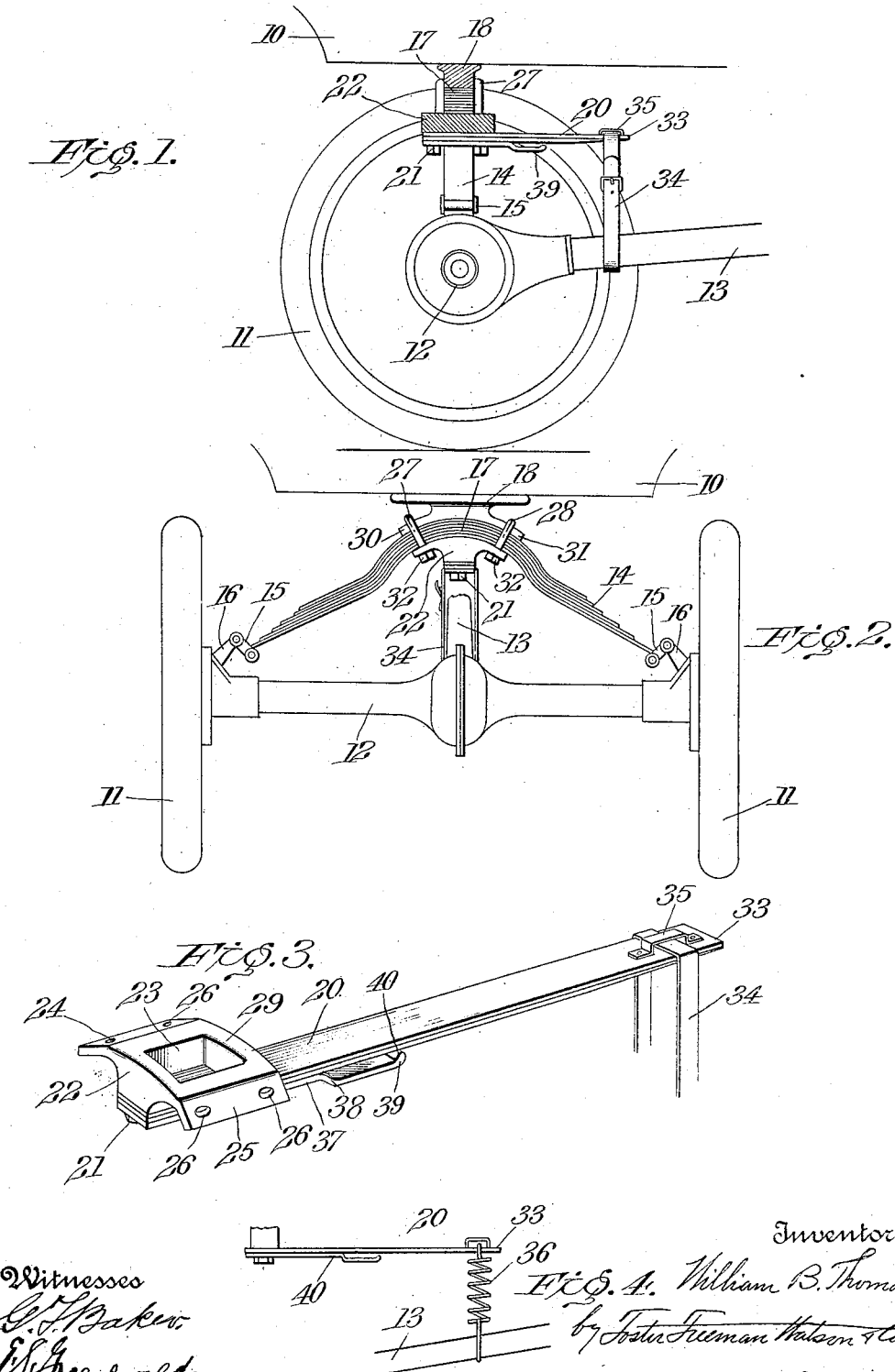

WILLIAM BANKS THOMAS, OF ELMIRA, NEW YORK.

SHOCK-ABSORBER.

1,165,039.

Specification of Letters Patent.   Patented Dec. 21, 1915.

Application filed February 9, 1915.   Serial No. 7,073.

*To all whom it may concern:*

Be it known that I, WILLIAM B. THOMAS, a citizen of the United States, and resident of Elmira, county of Chemung, State of New York, have invented certain new and useful Improvements in Shock-Absorbers, of which the following is a specification.

My invention relates to shock absorbers and has particular reference to an anti-reaction spring suitable for use on Ford automobiles, but it is to be understood that its application is not limited to such machines.

The primary object of the invention is to provide a device which will prevent the excessive reaction of the main body spring on an automobile, thereby causing the latter to ride much easier. The device is an attachment which can be readily placed on an automobile without changing any parts of the automobile.

The above and other objects and the novel features of the device will be apparent from the following description, taken in connection with the drawing in which, Figure 1 is a longitudinal sectional view of so much of an automobile as is necessary to show the application of my invention thereto; Fig. 2 is a rear elevation of the automobile showing the attachment in place thereon; Fig. 3 is a perspective view of the attachment embodying my invention; and Fig. 4 is an illustration of another form of the invention.

Referring to the drawing, 10 designates the body of the vehicle or automobile which is supported at the rear from the driving wheels 11. The driving wheels 11 are connected together by a casing 12 which incloses the usual drive shaft connected to the engine by suitable gearing and by a suitable transmission shaft inclosed within the transmission shaft casing 13 which extends forwardly from the casing 12 and longitudinally of the body 10. The transmission shaft casing 13 is rigidly connected to the axle casing 12 at the center thereof.

Means for yieldingly supporting the body 10 on the wheels 11 consists of a series of superposed flat leaf springs 14 which are bowed upwardly and extend longitudinally of and above the casing 12. The ends of the spring 14 are pivotally connected to links 15, which links in turn are pivotally connected to lugs 16 located at the ends of the casing 12 near the hubs of the wheels 11. The bowed portion 17 of the spring 14 located midway between the ends of the spring is usually fitted in a saddle or other suitable stud 18 secured to the under side of the body 10, the spring being held in place by U-bolts, plates or the like.

I have found that the reaction of the spring 14 is sometimes too great and in order to modify and arrest the reaction I have provided an attachment which may be located in place by simply detaching certain of the fastening means for the spring 14 and clamping the attachment in place, no special changes in the spring or any other parts of the automobile being required. The attachment or shock absorber as shown in Fig. 3 consists of a flat steel spring 20 or may consist of leaves. At one end the leaf or leaves 20 are securely attached by means of a bolt 21 to a casting or mounting 22. The casting 22 has a hollow opening 23 to receive the inner end of the bolt and has outwardly and downwardly extending flanges 24 and 25 at opposite sides of the cavity 23. The flanges 24 and 25 are each provided with holes 26 to receive the ends of the U-bolts 27 and 28 on opposite sides of the center line of the vehicle. The flanges 24 and 25, together with the central part 29 are designed to engage the underside of the bow part 17 of the spring 14 to provide an extended bearing surface. The U-bolts 27 and 28 engage over the lugs 30 and 31 of the saddle 18 and their ends fit through the holes 26 in the flanges 24 and 25 and are held in place by the nuts 32. In the foregoing manner the attachment is secured in place on the underside of the vehicle body and beneath the main vehicle spring 14 at a point directly over the rear axle.

The leaf or leaves which comprise the spring 20 extending forwardly under the body and longitudinally thereof, being disposed directly above the longitudinally extending transmission shaft casing 13. The front free end 33 of the plate 20 is connected to the casing 13 by means of a strap or similar adjustable device 34, which strap extends through a retaining eye 35 on the upper side of the spring 20. The strap 34 forms a loop around the casing 13 and may be adjusted so as to suitably tension the spring 20.

In Fig. 4 I have shown a spiral spring 36 connecting the free end 33 of the spring 20 and the casing 13 so that the free end of the spring 20 and the casing 13 will be yieldingly connected. The construction of the arrangement in Fig. 4 is otherwise the same as that shown in Fig. 3.

In order to prevent the excessive vibration of the spring 20 I have secured a device on the underside thereof to limit its movement. The device for limiting the movement of the spring 20 consists of a leaf or steel spring 37 considerably shorter than the spring 20 and fastened at one end by the bolt 21 or the same securing means that holds the spring 20 in place on the casting 22. The leaf 37 is bent downwardly at 38 and its free end 39 is spaced apart from the underside of the spring 20 so as to give the spring 20 a certain freedom of movement but to keep the end of that spring from moving an excessive amount. The extreme outer end of the free end 39 is bent upwardly slightly as at 40 to form a point which will engage the spring 20.

The operation of the attachment will be apparent from the foregoing description. The application of the device to a Ford automobile is a very simple operation. It is merely necessary to remove the four nuts and clamping plates from the U-bolts which usually hold the spring 14 in place and instead of the clamping plates to secure the casting 22 in position, as indicated. Then the strap 34 is passed around the transmission shaft casing 13 or the end of the spring 36 is secured into said casing. It requires only about fifteen minutes to apply the attachment to the vehicle. The device serves to prevent the excessive reaction of the main body spring 14 and protects said body spring in that it will prevent the breaking of such springs due to the reaction which such springs are subject to.

While I have shown and described the invention in detail I do not wish to be limited to the exact construction as it is clear that minor changes may be made therein without departing from the spirit of the invention.

Having described the invention what is claimed and desired to be secured by Letters-Patent is, 1. An attachment of the class described comprising a flat spring plate, a mounting therefor having an upper surface shaped so as to approximately fit in the concave portion of the body spring of an automobile to which it is attached, said plate having one end fastened to said mounting, and a device depending from the opposite or free end of said plate whereby the latter may be yieldingly connected to a part of the automobile.

2. A shock absorber attachment for automobiles comprising a flat spring plate, a mounting therefor having an upper surface shaped so as to approximately fit in the concave portion of the body spring of an automobile to which it is attached, said plate having one end thereof fastened to the under side of said mounting, a device depending from the opposite or free end of said plate whereby the latter may be yieldably connected to a part of the automobile, and a second plate having one end rigidly connected to said mounting and having a part thereof extending to a point intermediate the ends of said flat spring plate, and spaced a slight distance below the latter to limit the action thereof.

3. In a vehicle, the combination of a rear axle casing, a rigid member extending longitudinally of the vehicle and connected to the center of said casing, a main body spring bowed above said axle casing and having its ends connected adjacent the ends of the latter, a vehicle body, a saddle on the under side of said body, said saddle fitting the center part of the convex portion of said body spring, a shock absorber mounting having a part fitting the concave portion of said body spring at a point opposite said saddle, means securing said saddle, body spring and mounting together, a shock absorber spring carried by said mounting and extending forwardly thereof above said rigid member, and a device at the forward end of said shock absorber spring adapted to yieldably connect the latter to said rigid member.

In testimony whereof I affix my signature in presence of two witnesses.

WILLIAM BANKS THOMAS.

Witnesses:
   GEORGE H. BARTLET,
   FRED E. VOORHEES.